H. E. HERSHEY.
AUTOMATIC DISTRICT TELEPHONE SYSTEM.
APPLICATION FILED SEPT. 4, 1920.
Reissued Mar. 29, 1921. 15,073.
5 SHEETS—SHEET 1.
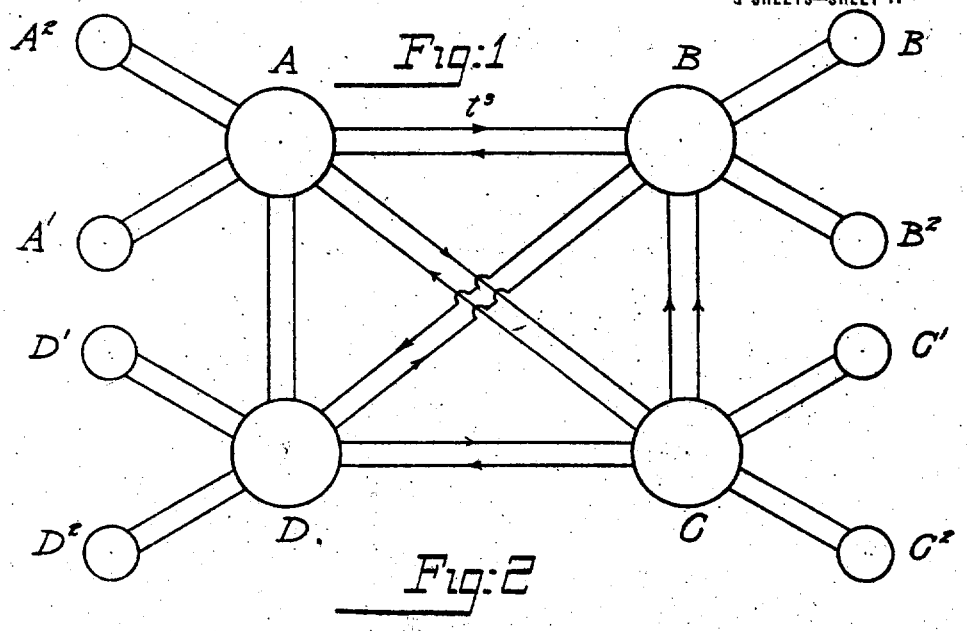
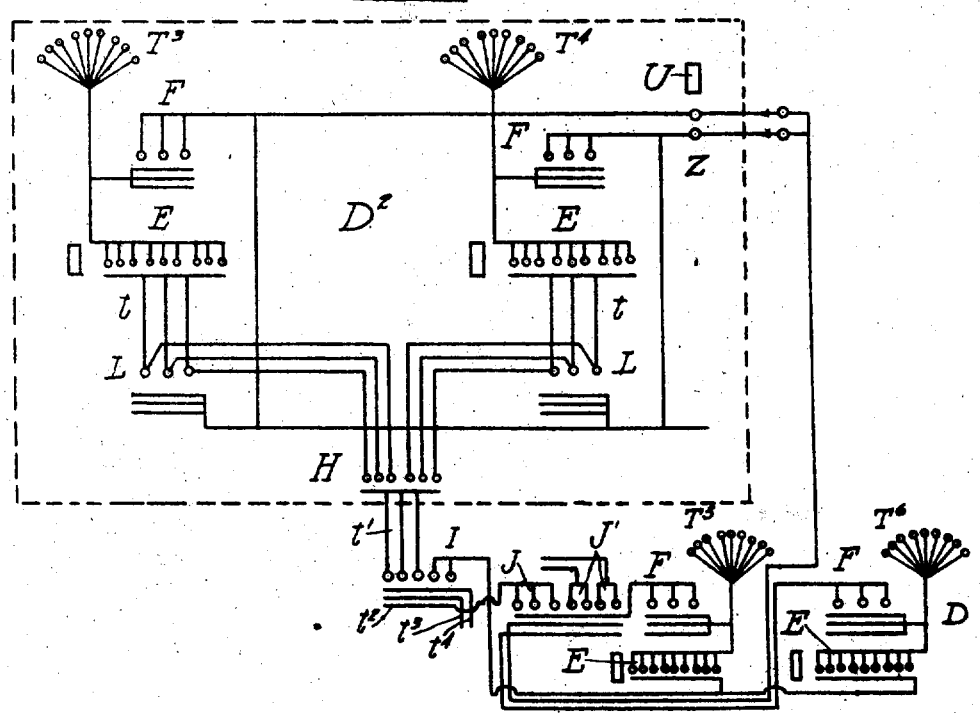
Inventor
Harry E. Hershey
Chas. W. Candy Atty.

H. E. HERSHEY.

AUTOMATIC DISTRICT TELEPHONE SYSTEM.

APPLICATION FILED SEPT. 4, 1920.

Reissued Mar. 29, 1921. 15,073.

5 SHEETS—SHEET 2.

Inventor
Harry E. Hershey
Chas. W. Candy Attv.

H. E. HERSHEY.

AUTOMATIC DISTRICT TELEPHONE SYSTEM.

APPLICATION FILED SEPT. 4, 1920.

Reissued Mar. 29, 1921. 15,073.

5 SHEETS—SHEET 3.

Inventor
Harry E. Hershey
Chas. W. Landy Atty.

H. E. HERSHEY.

AUTOMATIC DISTRICT TELEPHONE SYSTEM.

APPLICATION FILED SEPT. 4, 1920.

Reissued Mar. 29, 1921. 15,073.

5 SHEETS—SHEET 4.

Inventor
Harry E. Hershey
Chas. Th. Candy Atty.

H. E. HERSHEY.
AUTOMATIC DISTRICT TELEPHONE SYSTEM.
APPLICATION FILED SEPT. 4, 1920.
Reissued Mar. 29, 1921.
15,073.
5 SHEETS—SHEET 5.
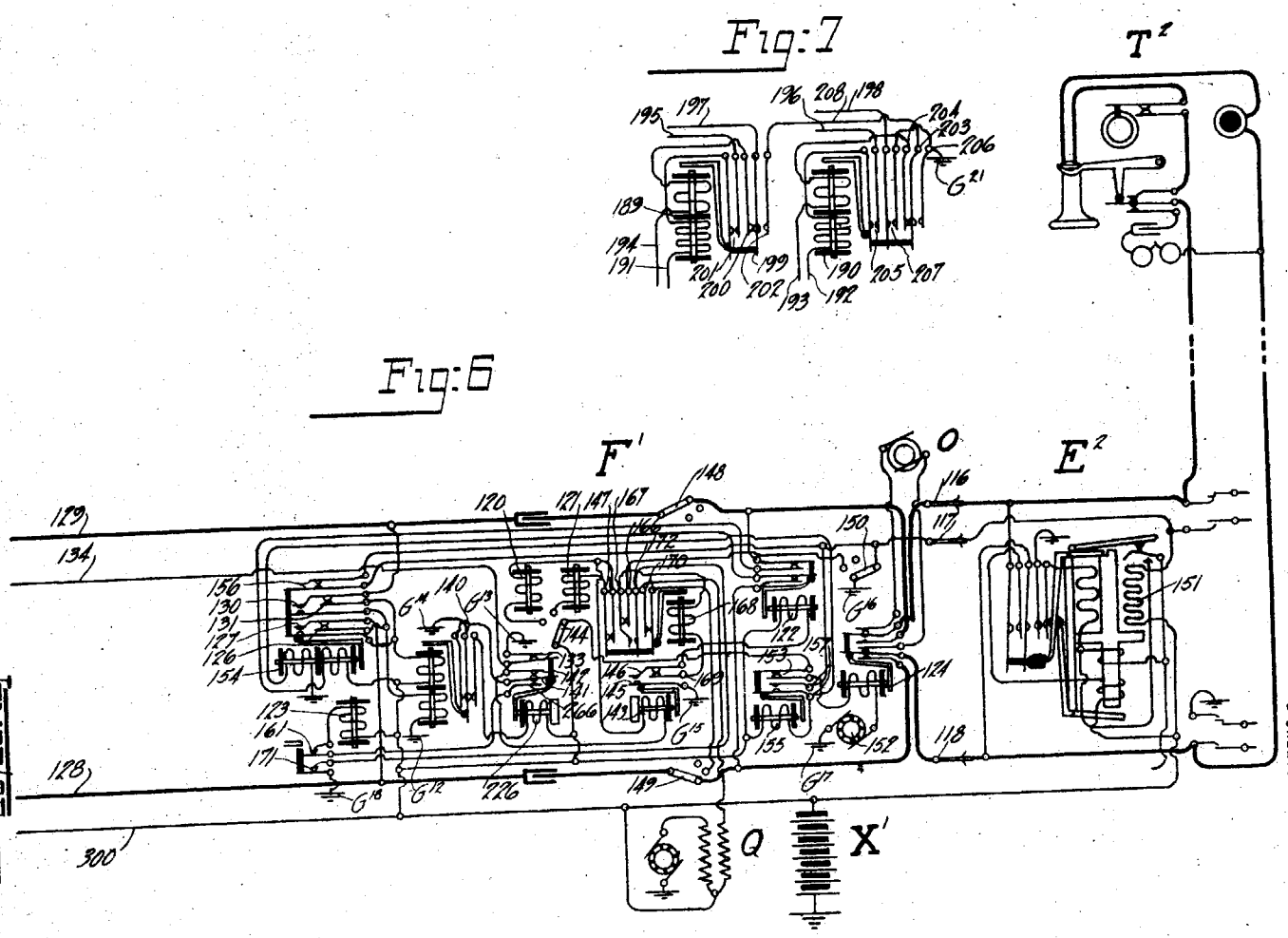
Inventor
Harry E. Hershey
Chas. W. Candy Atty:

UNITED STATES PATENT OFFICE.

HARRY E. HERSHEY, OF WHITEWATER, KANSAS, ASSIGNOR TO AUTOMATIC ELECTRIC COMPANY, OF CHICAGO, ILLINOIS, A CORPORATION OF ILLINOIS.

AUTOMATIC DISTRICT TELEPHONE SYSTEM.

15,073. Specification of Reissued Letters Patent. Reissued Mar. 29, 1921.

Original No. 1,283,182, dated October 29, 1918, Serial No. 855,803, filed August 8, 1914. Application for reissue filed September 4, 1920. Serial No. 408,372.

*To all whom it may concern:*

Be it known that I, HARRY E. HERSHEY, a citizen of the United States of America, and resident of Whitewater, in the county of Butler and State of Kansas, have invented certain new and useful Improvements in Automatic District Telephone Systems, of which the following is a specification.

My invention relates to automatic district telephone systems—that is, systems in which the subscribers' lines terminate in different offices or exchanges, and trunking connections are provided between these different exchanges in order to provide for the establishment of a connection between subscribers' lines which terminate in different exchanges.

The object of my invention is to provide improved trunking apparatus for establishing connection between lines in such a system, and to provide means whereby a connection which is local to any exchange can be made through apparatus local to that particular office, while when a call is made from one exchange to another, apparatus at a main or central office is automatically brought into use to establish such connection. By my invention I provide a repeating mechanism which, through its operations, determines whether a call shall be made through the apparatus local to a branch office, or whether the call shall pass through to the apparatus at a main exchange. Thus if a subscriber wishes to call another subscriber in the same exchange, the repeater operates to eliminate the apparatus at the main office and to permit the call to pass through apparatus local to the sub-exchange. If, however, the subscriber wishes to call a subscriber whose line terminates in another exchange, the repeater then operates to extend the connection through the apparatus at the main exchange.

My invention will be more clearly understood by reference to the accompanying drawings, in which I have illustrated the same in connection with a telephone system employing switches of well-known types.

In the drawings Figure 1 represents diagrammatically the layout of a multi-office telephone system embodying the principles of the invention disclosed herein.

Fig. 2 is a diagram showing more in detail the trunking arrangement of a portion of the system shown in Fig. 1.

Figs. 3, 4, 5 and 6 show a complete connection between a calling telephone T′ and a called telephone $T^2$ in the system shown herein.

Fig. 7 is a modified detail.

Figure 3:
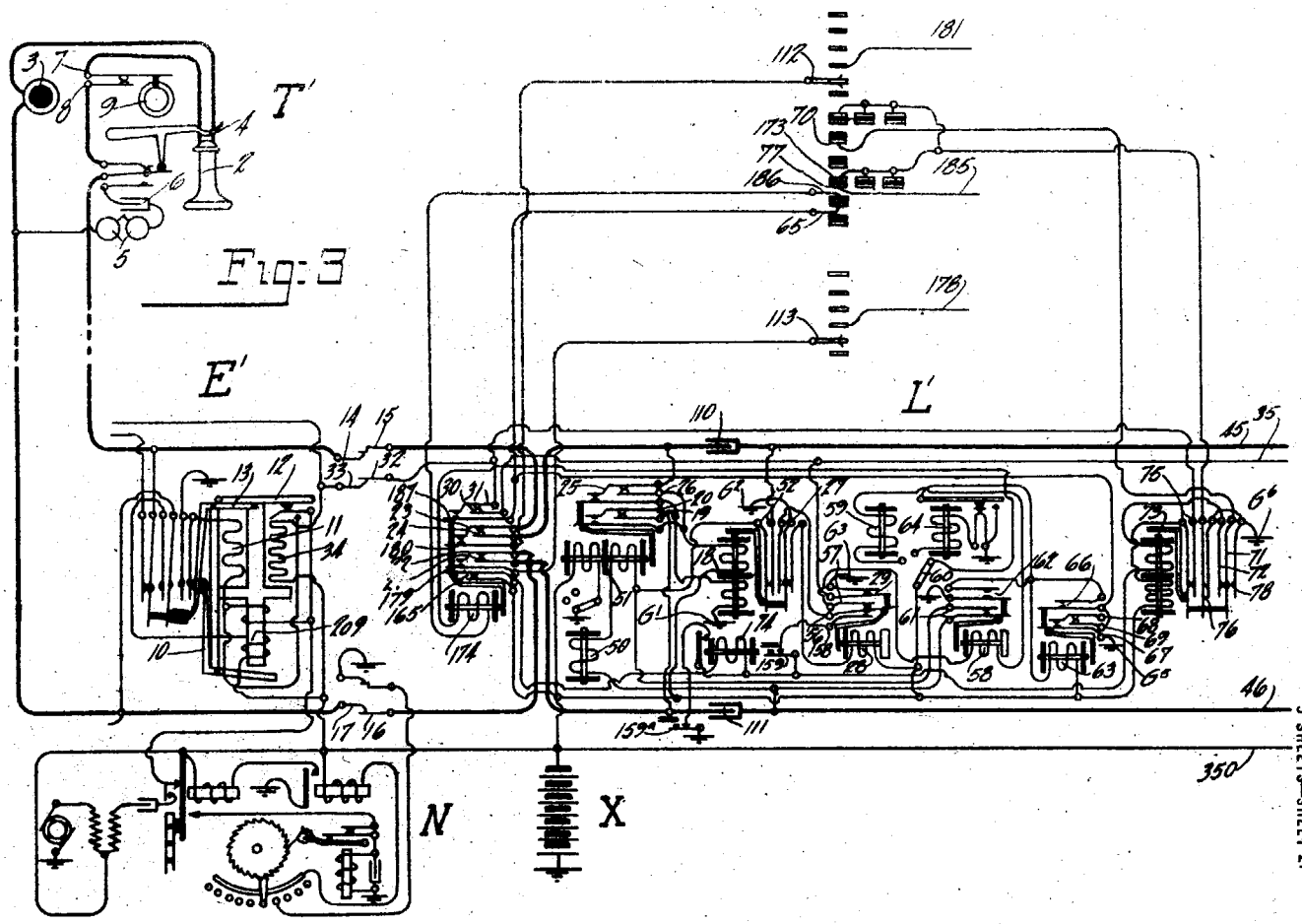
Figure 4:
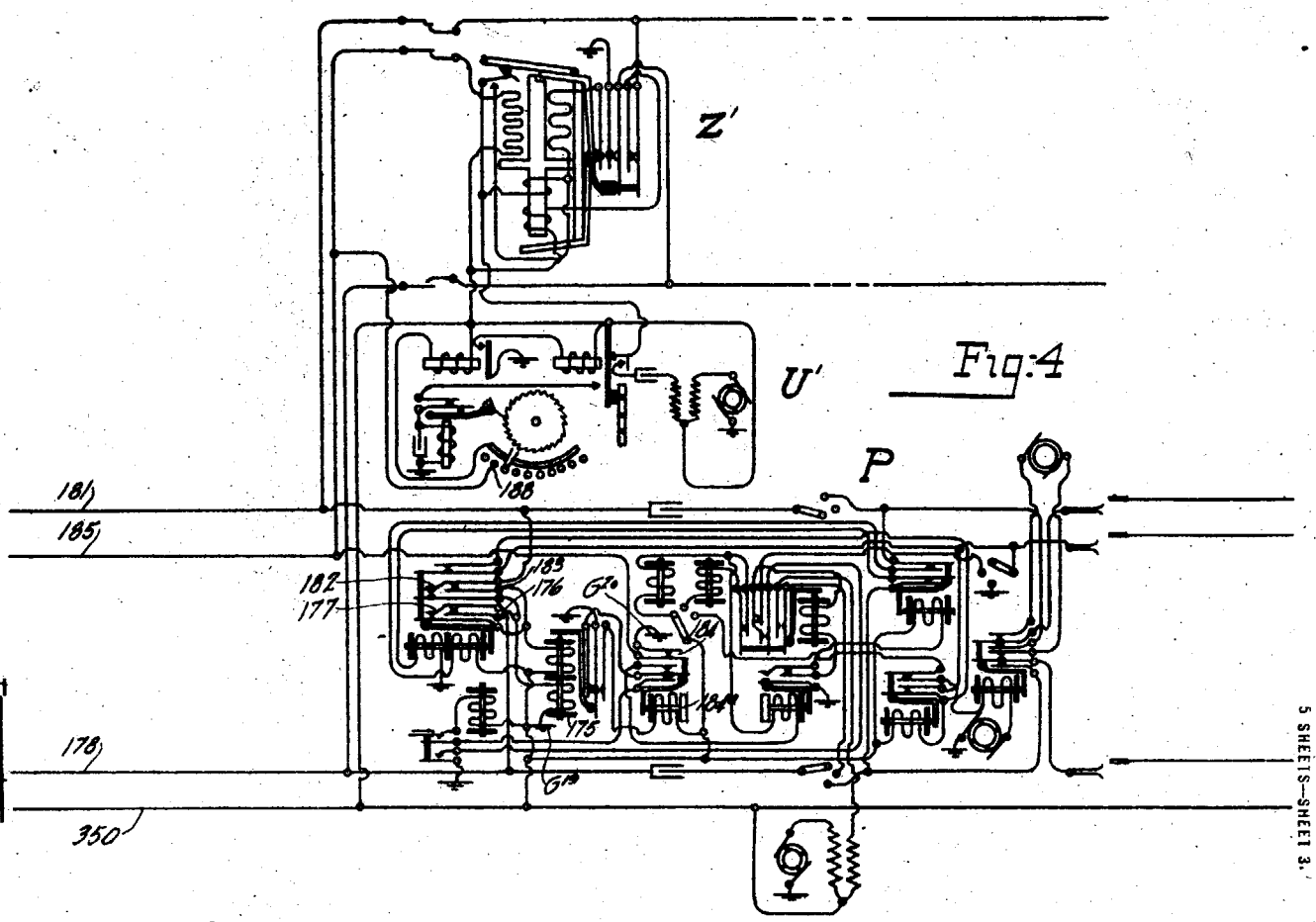

As shown in Fig. 1, the system represented herein is a multiple office or district system comprising a plurality of exchange offices A, B, C, D, A′, $A^2$, B′, $B^2$, etc. With respect to the trunk connections between offices, these are divided into two classes. The offices, A, B, C, and D are each connected with each of the others by a separate set of trunk lines, and for convenience these offices will be designated as main offices. The offices A′, $A^2$, B′, $B^2$, etc., are each connected by trunk lines with only the nearest main office A, B, C or D, as the case may be. The offices A′, $A^2$, B′, $B^2$, etc., will be termed branch offices. In a system of this character, when a subscriber whose line terminates at one of the main offices, the office A, for example, wishes to communicate with a subscriber whose line terminates at one of the other main offices, the office C, for example, the calling subscriber's line is connected through the medium of the suitable apparatus at his own office (office A) with a trunk line leading directly to the office of the called subscriber (office C), at which office said trunk line is connected with the line of the called subscriber. If a subscriber of one of the branch offices (office A, for example) wishes to call a subscriber of some other office, he must first obtain connection with a trunk line leading to his main office (office A). At this office connection may be made with a trunk line leading to the office of the called subscriber providing the called subscriber's line terminates in one of the main offices, or in another branch office (such as the office $A^2$) which is connected with the same main office as the calling subscriber. If the called subscriber's line terminates at a branch office (office C′, for example) of a second main office (office C), the calling subscriber, after having obtained connection over a trunk line with apparatus in his own main office (office A), must then obtain connection with a trunk line leading to said second main office (office C), and then, through the medium of apparatus at said second office to be connected with a trunk line leading to the branch office (office C′) of the called subscriber, where the connection is finally completed. Following out this general plan, if a subscriber of a branch office desired to obtain connection with a second subscriber of the same branch office, it has heretofore been necessary that he first obtain connection with a trunk line leading to a main office with which his branch office is connected, and would then obtain connection with a second trunk line leading back from the main office to the branch office, from which said second trunk line connection would finally be completed with the called subscriber's line. By my invention, however, the trunk lines leading from the branch office to the main office and back from the main office to the branch office are excluded from connections between the subscribers of the same branch office, said connections being established entirely by apparatus local to the branch office.

Referring to Fig. 2, the method of carrying out my invention is in general as follows: The apparatus inclosed within the dotted lines represents the apparatus of a branch office, while the remaining apparatus is assumed to be local to a main office. There are shown in this figure two groups of subscribers' substations $T^3$ and $T^4$, the line conductors of each of which terminate in an individual trunk-selecting or preselector switch E at the branch office. For the purpose of being called, those lines terminate in the banks of a plurality of connector switches F. These connector switches are represented herein by small circles, the three parallel lines underneath the same representing the multiple bank contacts which are assumed to be arranged in horizontal rows or levels. The individual switches E of each of the groups of subscribers' substations $T^3$ and $T^4$ have access to a group of trunk lines $t$ which lead to so-called secondary trunk-selecting switches H. The switches H have access to trunk lines $t'$ which lead to first selectors I in the main office. Associated with the main office there are shown two groups of subscribers' substations $T^5$ and $T^6$, each of which groups is provided with a group of preselecting or line switches at the central office for calling purposes, and with connections in the banks of a group of connector switches F for being called. Each of the groups of line switches E has access to a group of first selector switches I, which first selectors in turn have access to second selectors J. Although the bank contacts of all the first selectors shown in Fig. 2 are represented as being multipled together, it is to be understood that this figure is only diagrammatic, and any known or desired multipling arrangement of the selectors may be employed. As shown herein, the first level of the first selectors has access over trunk lines $t^2$ to second selectors J in the same exchange. The remaining two levels shown are assumed to have access to groups of trunk lines $t^3$ and $t^4$ leading to other main offices, where said trunk lines would terminate in second selectors. In like manner, the main office is provided with groups of second selectors J′ which are accessible through the first selectors of the other main offices in the system. The third and sixth levels of the second selectors J have access to trunk lines leading to line switches Z in the branch office, which in turn have access through the medium of connectors F to the subscribers' lines $T^3$ and $T^4$. The remaining levels of the same group of second selectors have access to connectors having access to the subscribers' lines in the main office. The remaining groups of second selectors may have access to connectors all of which are situated in the main office, or some of which are situated in a branch office and some in the main office, or in any manner desired. In each of the trunk lines $t$ which lead from the subscribers' individual switches E to the secondary switches H there is a switching device L which, under certain conditions, may operate to connect the trunk line which has been seized by a subscriber's individual switch with a connector in one or the other of the groups of connectors which have access to the branch office subscriber groups $T^3$ and $T^4$.

In general the operation of the system shown in Fig. 2 is as follows: Upon the removal of the receiver from the switch-hook by the subscriber of one of the branch office groups, his individual line switch E operates to select a trunk line leading to a secondary switch H, which in turn operates to select an idle first selector I. The subscriber operates his calling device to cause the selected first selector to extend connection to an idle second selector in the section or division of the exchange to which the called subscriber belongs. The selected second selector is then operated to extend the connection to an idle connector switch which has access to the group of subscribers to which the called subscriber belongs, which connector is then operated to establish connection with the called subscriber's line. Assuming now that the called subscriber is in the same branch office as the calling subscriber. Under these conditions, when the calling subscriber operates his calling device to cause the second selector to establish connection with a connector switch, the switching apparatus L, in the trunk line which has been seized by the calling subscriber's line switch, operates to extend the connection directly to one of the connectors having access to the group of subscriber's lines $T^3$ and $T^4$, depending upon the group in which the called subscriber's line is situated. In other words, when the trunking has progressed to the stage of eliminating all the sections except the section to which the call is to revert, then the switching apparatus L disconnects the call from the trunk line leading to the switch H and switches the call over to the local connectors F. When the apparatus L thus operates to extend the connection to a local connector, it causes the secondary switch H which was previously selected, as well as all the selectors which have been operated in the main office, to be released and the connection is therefore confined solely to the branch office.

The apparatus with which I have chosen to illustrate my invention is of a well-known type and is shown in patents of the prior art, and it is therefore thought necessary to show only such details of construction as are necessary to bring out the novel feature.

The telephone substation T′ (Fig. 3) comprises the usual receiver 2, transmitter 3, switch-hook 4, ringer 5 and condenser 6. Being an automatic substation, it is also provided with a suitable calling device or impulse transmitter which is represented herein by a pair of impulse springs 7 and 8 and an impulse wheel 9, which latter may be operated by the calling subscriber through the medium of a finger hole dial (not shown) to cause the impulse springs to be opened a number of times corresponding to the digit which it is desired to call.

The subscriber's individual switch E′ (Fig. 3), which may represent any of the switches E shown in Fig. 2, is of the general type of switch disclosed in British patent to R. W. James No. 26,301 of 1906, being of the more particular form shown in British patent to A. E. Keith No. 1419 of 1910. This line switch, as is well known, is provided with a movable plunger which, when idle, is always maintained opposite the bank terminals of an idle trunk line by a so-called master switch. Upon the operation of said switch its plunger is forced into the terminal springs of said trunk line to connect the subscriber's line therewith. The switch Z′ is similar in all respects to the switch E.

The master switch N is of the same general type as that disclosed in British Patent No. 26,301 of 1906, referred to above, being, however, of the particular type disclosed in said British Patent No. 1419 of 1910. The function of the master switch, as is well known, is to maintain the plungers of all idle switches in position to engage the terminals of an idle trunk line.

The apparatus shown at L′ (Fig. 3) is one of the switching devices shown at L in the diagrammatic Fig. 2. This device performs two functions. In a call from the branch office to the main office, it operates as a repeater to repeat the impulses from the calling substation to the trunk extending to the central station. In a local connection this device operates to free the trunk line leading to the main office and to divert the call to the proper local switches for completing the desired connection. This switching repeater comprises a vertically and rotatably movable switch shaft (not shown) which carries the wipers 65, 77, 112 and 113 and is controlled by the vertical magnet 59 and the rotary magnet 64 in the manner shown in United States Letters Patent No. 815,321, granted March 13, 1906, to Keith, Erickson and Erickson, for improvement in Selector Switches. These operations are controlled through the medium of a double-wound line relay 18 which is connected with the line conductors through the springs of a reversing relay 51. The relay 51 is double-wound and is so adjusted that it is operatively energized only when both windings are energized in the same direction. The line relay 18 controls a second bridge across the trunk conductors for the purpose of repeating impulses to the main exchange in a manner to be hereinafter more fully explained. The magnet 74 is the usual release magnet for restoring the switch shaft and side switch to normal position upon the release of the connection. However, the release magnet is adapted to release the switch shaft immediately upon energization, rather than upon the deënergization thereof as shown in said selector patent. This release magnet is connected in series with a double-wound relay 73. The switching repeater L′ is also provided with a so-called side switch similar to that shown in said selector patent, together with two relays 28 and 58 which are slow acting—that is, relays which deënergize slowly after their energizing circuits have been broken. There are ten rows or levels of bank contacts for each of the wipers 65, 77, 112 and 113. The bank contacts accessible to the wipers 112, 65 and 113 of the levels corresponding to the branch exchange in which the repeater L′ is located are multipled between banks, while the contacts in each level of the bank accessible to the wiper 77 are connected together, and the levels which correspond to the groups of connectors in the branch exchange are connected to the left hand spring 76 of the relay 73 of each repeater L′. Also in the bank associated with the wiper 65 the first contact in the level corresponding to the main office with which the branch office is connected is connected with the spring 71 of the relay 73. For example, if the numbers in the branch office begin with the digit 5, whenever the dial is operated for the first digit 5 the wipers will be raised to the fifth level, and upon cutting in upon the first contact in said level will close a circuit which will cause the release of this switch, at the same time causing a ground to be placed upon all the contacts accessible to the wiper 77 which are connected with the spring 76. If the first digit called by the first operation of the dial is other than 5, the switch will not be released, but will come to rest upon the first contact in the level to which it has been raised, but should this level be one which leads to the local connectors, the switching relay 174 will not be operated for the reason that at this time there is no ground on the spring 76, as the relay 73 has not been energized by the switch releasing from the fifth level. It may be noted here that should the switch be resting upon a bank contact leading to a connector, and the switching relay 174 is not energized, the contact in question is not made busy, for the switch does not place a ground upon its private wiper when said wiper is in third position. After the first digit 5 has been called, should the next digit called be that of a group of connectors at the branch office, the switch, upon coming to rest upon the first idle contact in that level, will have its switching relay 174 energized, due to the ground now upon the spring 76.

Figure 5:
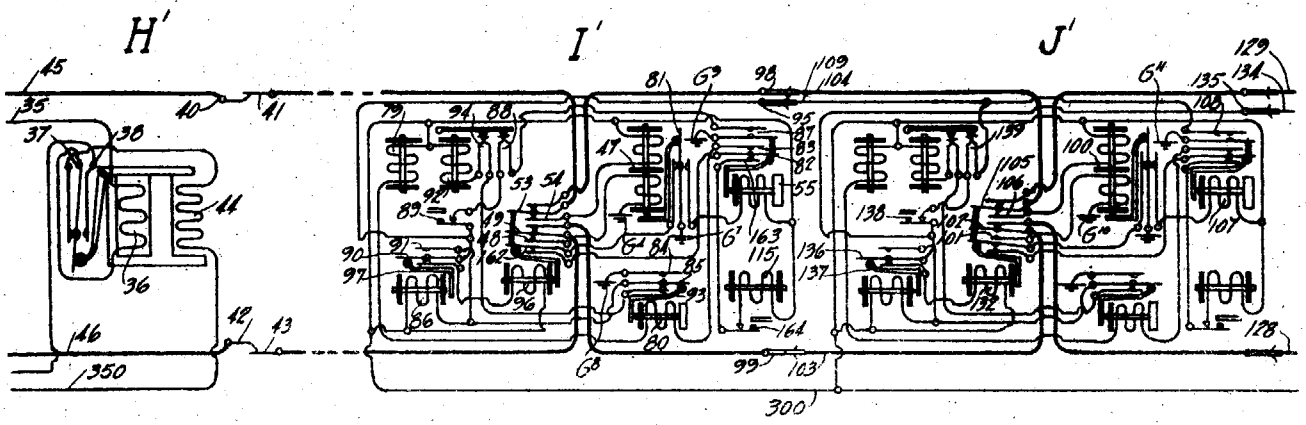

The secondary switch H′ (Fig. 5), which corresponds to one of the switches H, is the same in principle as the subscriber's individual switch E′, being somewhat simplified, however, in that it is not provided with line or cut-off relay armatures. This switch belongs to a group which is controlled by a master switch (not shown) similar to the master switch N.

The selector switches I′ and J′, which may represent any of the respective switches I or J (Fig. 2), are of the general type of selector switches disclosed in said Letters Patent No. 815,321, above referred to, being somewhat modified, however, as shown in British Patent No. 1419 of 1910, hereinabove referred to, so as to operate in a two-wire system. The customary side switch is likewise dispensed with, the circuits being further slightly modified on this account. Referring to the selector I′, each of these switches comprises among other details a bank of contacts arranged in rows or levels and adapted to be engaged by a set of wipers 95, 98 and 99 which are carried by a vertically and rotatably movable shaft (not shown) which is controlled by the usual vertical and rotary magnets 79 and 92. The usual release magnet 115 is adapted to release the switch shaft immediately upon energization, rather than by the deenergization thereof, as shown in said selector patent. The relays 55 and 80 are slow acting.

The connector switch F′, which may correspond to any of the connector switches F (Fig. 2), is of the general type of connector shown in United States Letters Patent No. 815,176, granted March 13, 1906, to Keith, Erickson and Erickson, being modified, however, in order to operate in a two-wire system. The switch comprises among other details a bank of contacts arranged in rows or levels which are adapted to be engaged by a set of wipers 116, 117 and 118, which wipers are carried by a vertically and rotatably movable shaft (not shown) which is controlled by the usual vertical and rotary magnets 120 and 121. The usual side switch is controlled by the private magnet 122 in the well-known manner. The usual release magnet 123 is adapted to release the switch shaft immediately upon energization, rather than by the deënergization thereof, as shown in said connector patent. At 124 is shown the ringer relay by means of which ringing current is projected onto the called line. The relays 143 and 226 are slow acting. The connector P is similar in all respects to the connector F′.

The telephone substation $T^2$ and the individual switch $E^2$ are in all respects the same as the telephone substation T′ and the switch E′ (Fig. 3).

At O (Fig. 6) there is represented a ringing current generator and at Q is shown a busy signaling machine, while the batteries X and X′ are for supplying current for operating the central office apparatus and for talking purposes.

Having given a general description of the system and apparatus in connection with which it has been chosen to illustrate the invention disclosed herein, there will now be given a more or less detailed description of the operations by which the connections are established between the various subscribers. Since the apparatus shown herein is in general well known in the art, and is fully described in the publications herein referred to, it is not thought necessary to describe its operation in detail herein. It will first be explained how a connection is extended from the telephone substation T′ of a branch office to a telephone substation $T^2$ of the main office, out of which latter office the said branch office operates. The number of the calling substation will be assumed to be 5600 and the number of the called substation will be assumed to be 5200.

Upon the removal of the receiver at the calling substation, a bridge is formed across the calling line through the transmitter 3 and receiver 2 by the closure of the switch-hook springs, whereby an energizing circuit is closed through the line winding 209 of the subscriber's switch E′. The winding 209, upon energizing, attracts the armature 10, whereby a circuit is closed through the pull-in winding 11, which operates to attract the plunger arm 12 and cut-off armature 13. The plunger arm 12, upon being attracted, thrusts the plunger into its bank of contacts, whereby the line circuit is extended through the springs 14 and 15 and 17 and 16 to the switching repeater L′, while the armature 13 operates to disconnect the winding 209 from the line. When the connection is extended to the switching repeater, a circuit is closed through its line relay 18, said circuit extending from ground G′ through the lower winding of the relay 18, relay springs 19 and 20, relay springs 21 and 22, line springs 16 and 17 to and through the substation T′, line springs 14 and 15, relay springs 23 and 24, relay springs 25 and 26 and the upper winding of the relay is to battery X. The relay 18, upon energizing, closes a circuit from ground $G^2$ through the front contact of the spring 27 and the relay 28 to battery X. One result of the energization of the relay 28 is the closure of a circuit extending from ground $G^3$ through the springs 29 of the relay 28, springs 30 and 31 of the relay 174, private line springs 32 and 33 and the holding winding 34 to battery X. The winding 34, upon energizing, serves to hold the switch E′ in its operated position after the line winding has been disconnected from the line and broken the circuit of the winding 11. A further result of the energization of the relay 28 is the closure of a circuit extending from ground $G^3$ through the springs 29, conductor 35, winding 36 of the secondary switch H′ (Fig. 5), springs 37 and 38 and the springs on a master switch (not shown) to battery X. The switch H′ thereupon operates to extend the connection through the springs 40 and 41 and the springs 42 and 43 to the selector I′, while at the same time, by the shifting of the spring 37, the winding 36 is connected with the battery lead through the high resistance winding 44, so as to reduce the holding current of the switch H′. A further result of the energization of the line relay 18 when the connection is first extended thereto is the closure of a bridge across the trunk conductors 45 and 46, whereby, as soon as the connection is extended to the first selector I′, as above described, an energizing circuit is closed for the line relay 47. This circuit extends from ground $G^4$ through the lower winding of the relay 47, springs 48 and 49, springs 43 and 42, conductor 46, coil 50, the right-hand winding of the relay 51, springs 52, conductor 45, springs 40 and 41, springs 53 and 54 and the upper winding of the relay 47 to battery X′. The relay 51 is not operatively energized at this time because only one winding has current flowing through it. The relay 47, upon energizing, closes a circuit through the slow acting relay 55.

The foregoing operation takes place immediately upon the removal of the receiver from the switch-hook at the calling substation. The calling subscriber now operates his calling device in the usual manner for the first digit 5 of the called number, whereby the substation impulse springs 7 and 8 are separated five times momentarily. Each time the substation impulse springs are separated, the line relay 18 of the switching repeater is momentarily deënergized. The breaking of contact between the springs 52 each time the relay 18 deënergizes opens the bridge across the trunk conductors 45 and 46, thereby momentarily breaking the energizing circuit of the line relay 47 of the first selector I′. The relay 28 in the switching repeater being slow acting does not deenergize during the momentary interruptions of its circuit by the relay 18, and therefore, each time the spring 27 engages its back contact, an impulse is transmitted over a circuit extending from ground $G^2$ through the spring 27 and its back contact, springs 56 and 57, relay 58, vertical magnet 59 and the side switch wiper 60 (in first position) to battery X. The vertical magnet 59 receives five impulses over this circuit and operates to raise the shaft wipers opposite the fifth level of bank contacts. The slow acting relay 58 is energized by the first impulse which is transmitted through it and remains in its operated position until after the last impulse is delivered for the digit. In its operated position the relay 58, by placing the springs 61, in contact, short-circuits the coil 50 and the right-hand winding of the relay 51, so as to remove their resistances from the circuit of the line relay of the selector I′, while impulses are being transmitted through it. The closure of the springs 62 completes an energizing circuit for the private magnet 63. Upon the breaking of this latter circuit when the relay 58 deënergizes after the last impulse for the digit is delivered from the substation, the private magnet 63 deënergizes and permits the side switch to pass to second position. The side switch wiper 60, upon passing to second position, closes a circuit through the rotary magnet 64, which thereupon energizes and rotates the shaft wipers one step, upon the first contact in the fifth level. The wiper 65 will meet with no guarding potential upon the first contact of the fifth level, as hereinbefore described, whereupon the private magnet will deënergize. At the time that the springs 67, 68 and 69 are in engagement, a circuit may be traced from ground $G^5$ through the springs 67, 68 and 69, wiper 65, bank contact 70, springs 71 and 72, upper winding of the relay 73, release magnet 74 and the springs 165 to battery X. The release magnet will energize over this circuit and operate to restore the shaft of the switching repeater to normal, without in any way affecting the first selecor I′. The relay 73 will be energized in series with the release magnet and, upon operating, will close a locking circuit for itself from ground $G^3$ through the springs 29, springs 30 and 31, springs 75 and the lower winding of the relay 73 to battery X. The energization of the relay 73, by the bringing into contact of the springs 76, places ground from ground $G^6$ upon all the bank contacts accessible to the wiper 77 which correspond to the groups of connectors in the branch office. Also, the engagement of the spring 78 with the spring 71 places ground from ground $G^6$ upon the first contact in the fifth level which is accessible by the wiper 65. The five impulses which are transmitted to the line relay 47 of the first selector I′ by the relay 18 of the switching repeater cause five impulses to be transmitted through the vertical magnet 79 in series with the slow acting relay 80, whereby the shaft wipers are lifted five steps. The said circuit may be traced from ground $G^7$ through the spring 81 and its back contact, springs 162, springs 82 and 83, relay 80 and the vertical magnet 79 to battery X′. The slow acting relay 80 is maintained in its energized position continuously while impulses are being transmitted to the vertical magnet through it, and in its energized position closes a circuit extending from ground $G^8$ through the springs 84 and 85 and the relay 86 to battery X′. The relay 86, upon energizing, forms a locking circuit for itself extending from ground $G^9$ through the springs 87 and 88, off normal springs 89, springs 90 and 91 and the relay 86 to battery X′. Thus, upon the deënergization of the relay 80 after the last impulse is delivered to the vertical magnet, the relay 86 remains energized and the circuit of the rotary magnet 92 is closed. Said circuit extends from ground $G^9$ through the springs 87, springs 88, off normal springs 89, springs 90 and 91, springs 85 and 93, springs 94, and the rotary magnet 92 to battery X′. The rotary magnet, upon energizing, rotates the wipers one step and, by opening the springs 88 and 94, disconnects ground $G^9$ from itself and from the relay 86. If the first trunk line of the fifth level is idle, the relay 86 deënergizes as soon as the springs 88 are opened. If the trunk line is busy, however, the private wiper 95 finds the contact which it engages provided with a guarding ground potential which is transmitted through the springs 90 and 91 to the relay 86, the same preventing the relay 86 from deënergizing. The rotary magnet, however, deënergizes when the springs 94 are broken, regardless of whether or not the relay 86 remains energized. The circuit of the rotary magnet will again be closed as soon as its armature drops back far enough to close the springs 88 and 94. The rotary magnet will therefore operate in a manner similar to that of a buzzer to advance the wipers step by step over the contacts, until the non-grounded contact of an idle trunk is reached by the wiper 95, whereupon the relay 86 deënergizes. The relay 86, upon deënergizing, whether after one or several operations of the rotary magnet, permanently breaks the circuit of said rotary magnet and closes the circuit of the switching relay 96. Said circuit extends from ground $G^9$ through the springs 87, springs 88, off normal springs 89, springs 90 and 97 and the relay 96 to battery X′. The relay 96, upon energizing, disconnects the line relay 47 from the line and extends the line connection through the wipers 98 and 99 to the second selector J′. The line relay 100 of the second selector J′ becomes energized over a circuit extending from ground $G^{10}$ through the lower winding of the relay 100, springs 101 and 102, conductor 103, over the heavy conductor to and through the switching repeater L′, over the heavy conductor to the conductor 104, springs 105 and 106 and the upper winding of the relay 100 to battery X′. The relay 100, upon energizing, closes a circuit through the slow acting relay 107, which in turn affords a holding ground for the relay 96 to take the place of ground $G^9$, which will presently be removed. Said circuit extends from ground $G^{11}$ through the springs 108, conductor 109, private wiper 95, springs 90 and 97 and the relay 96 to battery X′.

The calling subscriber now operates his calling device for the second digit 2 of the called number, in response to which the shaft wipers of the switching repeater come to rest upon the first contact of the second level in the bank. The second level being dead in the branch office, its first contact will always be idle. When the side switch of the selector-repeater passes to third position, a circuit is closed through the left-hand winding of the relay 51, but the relay 51 will not be operatively energized at this time, for the current in its two windings oppose each other. In response to the impulses sent over the trunk by the relay 18, the second selector J′ operates to place its shaft wipers upon the first idle contact of the second level in its banks and to extend the lines to the connector F′ in the same manner as explained for the selector L′. When the line has been extended to the connector F′, a circuit may be traced from ground $G^{12}$ through the lower winding of the relay 125, springs 126 and 127, conductor 128, over the heavy conductor to and through the switching repeater L′, over the other heavy conductor to the conductor 129, through the springs 130 and 131 and the upper winding of the relay 125 to battery X′. The relay 125, upon energizing, closes a circuit through the relay 226, which in turn, upon energizing, affords a new holding ground for the relay 96 of the selector I′ and the relay 132 of the selector J′. Said circuit may be traced from ground $G^{13}$ through the springs 133, conductor 134, private wiper 135, springs 136 and 137 and the relay 132 to battery X′. At the private wiper 135 a branch of the above-traced circuit extends through the off normal springs 138, springs 139, conductor 109, private wiper 95, springs 90 and 97 and the relay 96 to battery X′.

The substation calling device is now operated for the third digit O, whereby the switching repeater L′, by means of the line relay 18, opens the circuit of the line relay 125 a corresponding number of times. Each time the relay 125 is deënergized, a circuit is closed through the vertical magnet 120. The relay 226 being slow acting does not deenergize during the momentary interruptions of its circuit. The circuit through the vertical magnet 120 extends from ground $G^{14}$ through the spring 140 and its back contact, springs 141 and 142, relay 143, vertical magnet 120 and the side switch wiper 144 (in first position) to battery X′. The vertical magnet receives ten impulses over this circuit and operates to raise the shaft wipers opposite the O line of bank contacts. The relay 143, which is included in the operating circuit of the vertical magnet, remains in its energized position during the entire time that impulses are being transmitted through it and operates to close the circuit of the private magnet 122 as follows: From ground $G^{15}$ through the springs 145 and 146 and the private magnet 122 to battery X′. After the last impulse has been delivered, the relay 143 opens the circuit of the private magnet 122, which, upon deenergizing, permits the side switch to pass from first to second position. The movement of the side switch wiper 144 from first to second position transfers the battery connection from the vertical magnet 120 to the rotary magnet 121.

The calling subscriber now operates his calling device for the last digit O, whereby the switching repeater L′, by means of the line relay 18, opens the circuit of the line relay 125 a corresponding number of times. Each time the relay 125 is deënergized, a circuit is closed through the rotary magnet extending from ground $G^{14}$ through the spring 140 and its back contact, springs 141 and 142, relay 143, springs 147, rotary magnet 121 and the side switch wiper 144 (in second position) to battery X′. The rotary magnet receives ten impulses over this circuit and operates to rotate the shaft wipers upon the line of the called subscriber. The relay 143 operates in response to the impulses for the digit in the same manner as for the previous digit, to cause the private magnet 122 to advance the side switch to third position. By the engagement of the side switch wipers 148 and 149 with their third-position contact points, the line connection is completed with the called line. Upon the engagement of the side switch wiper 150 with its third-position contact point, a circuit is completed through the cut-off winding of the called line switch. The said circuit extends from ground $G^{16}$ through the side switch wiper 150 (in third position), private wiper 117 and the cut-off winding 151 to battery X′. The cut-off winding of the called line switch, upon energizing, operates to disconnect the line relay from the called substation. The connection of ground $G^{16}$ with the connector private bank contact of the called line prevents the called line from being seized by some other connector switch. By the engagement of the side switch wiper 144 with its third-position contact point, the circuit of the ringer relay 124 is closed. Said circuit extends from ground $G^{17}$ through the interrupter 152, relay 124, springs 153 and the side switch wiper 144 (in third position) to battery X′. The ringer relay disconnects the calling line from the called line and bridges the ringing current generator O across the called line to signal the called subscriber. The ringer relay is energized only intermittently through the medium of the interrupter 152. Upon the response of the called subscriber his line is provided with talking current through the windings of the back-bridge relay 154, which, upon energizing, closes a circuit through the ringer cut-off relay 155. This current extends from ground $G^{16}$ through the side switch wiper 150 (in third position), springs 156 and the relay 155 to battery X′. The relay 155, upon energizing, interrupts the circuit of the ringer relay at the springs 153 and closes a locking circuit for itself through the springs 157 independent of the spring 156. The energization of the relay 154 also reverses the flow of current in the trunk from the switching repeater L′. Since the current in the right-hand winding of the relay 51 is now reversed, the two windings help each other and the relay 51 becomes operatively energized, and in so doing reverses the current in the line to the substation T′.

After the conversation is completed, the connection is released by the hanging up of the receiver at the calling substation in the following manner: When the receiver at the substation T′ is restored to the switch-hook, the separation of the switch-hook springs destroys the energizing circuit of the switching repeater line relay 18. The relay 18 upon deënergizing, opens the circuit of the relay 28, which in turn, upon deënergizing, closes a circuit through the release magnet. Said circuit extends from ground $G^2$ through the spring 27 and its back contact, springs 56 and 158, off normal springs 159, release magnet 74 and the springs 165 to battery X. The release magnet, upon energizing, withdraws the retaining pawls from the shaft and its own circuit is broken at the off normal springs 159 and $159^a$ when the shaft reaches its lowest position. The deënergization of the relay 28 also removes ground $G^3$ from the conductor 35, which allows the secondary switch H′ to return to normal position. The deënergization of the relay 18 opens the energizing circuit of the relay 125 of the connector F′. The relay 125, upon deënergizing, opens the circuit of the relay 226. The relay 226, upon deënergizing, closes a circuit through the release magnet 123 from ground $G^{14}$ through the spring 140 and its back contact, springs 141 and 266, off normal springs 161 and the release magnet 123 to battery X′. The release magnet, upon energizing, withdraws the retaining pawls from the shaft and its own circuit is broken at the off normal springs 161 when the shaft reaches its lowest position. The deënergization of the relay 226 removes the holding ground from the relay 132 of the selector J′ and of the relay 96 of the selector I′. The deënergization of the relay 96 closes a circuit through the release magnet 115, said circuit extending from ground $G^7$ through the spring 81 and its back contact, springs 162, springs 82 and 163, off normal springs 164 and the release magnet 115 to battery X′. The release magnet, upon energizing, withdraws the retaining pawls from the shaft and its own circuit is broken at the springs 164 when the shaft reaches its lowest position. The selector J′ is released in the same manner. The deënergization of the relay 28 removes the holding ground from the holding winding 34 of the line switch E′. Upon the deënergization of the holding winding 34 the plunger arm 12 removes the plunger from the bank.

It having been explained how a subscriber establishes connection and releases the same, it will now be explained how a connection is prevented from being made with a busy line. If the called number is busy there will be a guarding potential upon the connector private bank contact, just as explained in connection with the line switch E′. The connector private wiper 117, upon engaging this guarded contact, completes a circuit from ground at the private bank contact through the private wiper 117, side switch wiper 150 (in second position), springs 166 and 167, relay 168, springs 169 and 146 and the private magnet 122 to battery X′. The relay 168, upon energizing, opens the circuit of the rotary magnet at the springs 147 and places the busy current from the busy machine Q upon the calling line by means of the springs 170 and the side switch wiper 149 (in second position). The relay 168 also forms a locking circuit for itself from ground $G^{18}$ through the off normal springs 171, springs 172 and 167, relay 168, springs 169 and 146 and the private magnet 122 to battery X′. The calling subscriber, upon hearing the busy signal, replaces the receiver upon the hook, whereupon the switches are released in practically the same manner as described above.

It will now be explained how a connection is extended from the telephone substation T′ of a branch office to a telephone (not shown) of the same branch office. The number of the called telephone will be assumed to be 5300.

Upon the removal of the receiver at the substation T′, the action of the line switch E′, the switching repeater L′, the secondary switch H′, and the first selector I′ is the same as previously described.

Upon the operation of the calling device for the first digit 5, the switching repeater operates to raise its shaft wipers to the fifth level and to then release therefrom, thus locking up the relay 73, as previously explained. The action of the selector I′ is the same as previously explained.

The calling subscriber now operates his calling device for the second digit 3 of the called number. As a result the switching repeater raises its shaft wipers to a position opposite the third level, from which point it seeks the first idle contact in the said level of banks in the following manner: As soon as the side switch wiper 60 passes to second position, a circuit is closed through the rotary magnet 64, which, upon energizing, rotates the shaft wipers one step and closes a circuit through the private magnet 63. Should the contact upon which the wiper 65 is rotated have a guarding potential upon it, a circuit will be closed extending from ground at the bank contact through the springs 66 and the private magnet 63 to battery X. In this way the private magnet will be energized as long as the wiper 65 is passing over busy contacts. At the first idle contact the circuit through the private magnet will be broken and the private magnet, upon deënergizing, will allow the side switch to pass to third position, thereby opening the circuit of the rotary magnet 64. The operation of the selector J′ for this digit is the same as previously explained. When the side switch of the switching repeater L′ passes to third position, a circuit may be traced from ground $G^6$ through the springs 76, bank contact 173, wiper 77, switching relay 174 and the side switch wiper 60 (in third position) to battery X. The springs of the relay 174 are adjusted to make contact with their front contacts before they break contact with their back contacts. The relay 174, upon becoming energized over the above circuit, operates to shift the calling line from the line relay 18 to the line relay 175 of the connector P. A circuit may now be traced from ground $G^{19}$ through the lower winding of the relay 175, springs 176 and 177, conductor 178, wiper 113, springs 179 and 22, springs 16 and 17 to and through the substation T′, springs 14 and 15, springs 23 and 180, wiper 112, conductor 181, springs 182 and 183 and the upper winding of the relay 175 to battery X. The relay 175, upon energizing over the above circuit, closes a circuit through the relay $184^a$. The relay $184^a$, upon energizing, affords a holding circuit for the holding winding 34 of the line switch E′ and also places a guarding potential upon the bank contacts in the master switch bank which is associated with the connector P. This holding circuit may be traced from ground $G^{20}$ through the springs 184, conductor 185, bank contact 186, wiper 65, springs 187 and 31, springs 32 and 33 and the holding winding 34 to battery X. A branch of the above circuit also extends from the conductor 185 to the bank contact 188. A second branch of the above circuit extends from the springs 31 through the springs 75 and the lower winding of the relay 73 to battery X. The line relay 18, upon being disconnected from the line, deenergizes and opens the circuit of the relay 28, which in turn, upon deënergizing, removes ground $G^3$ from the conductor 35, which allows the secondary switch H′ to return to normal position. At the same time the selectors I′ and J′ release, as previously explained.

Upon the subscriber at substation T′ calling the last two digits of the called number, the action of the connector P is the same as explained for the connector F′.

Upon the completion of the conversation, the restoring of the receiver to the switchhook at the substation T′ opens the circuit of the line relay 175, which, upon deënergizing, opens the circuit of the relay $184^a$. The relay $184^a$, upon deënergizing, removes ground $G^{20}$, which causes the holding winding 34 to deënergize and allows the line switch E′ to return to normal. The removal of ground $G^{20}$ also opens the circuit of the lower winding of the relay 73, which, upon deënergizing, removes ground $G^6$ from the circuit of the relay 174. The relay 174, upon deënergizing, closes the circuit of the release magnet and the switching repeater releases, as previous explained.

In the present disclosure the line switch Z′ is for the purpose of extending a connection from the main exchange to an idle connector switch, as is shown at P. As previously explained, when the connector P is busy there will be a ground potential upon the master switch bank contact 188, which corresponds to said connector. If the master switch U′ at this time happens to hold the idle line switch plungers opposite the trunk line leading to the switch P, it will operate in the known manner to carry said plungers opposite the next idle trunk which leads to another connector, similar to P. As is well known the line switch Z′ has access through its bank contacts to a number of connectors P, the master switch U′ being the medium for determining the idle and busy condition of said connectors. It will now be assumed that connector P is idle and that the plunger (not shown) of switch Z′ is standing opposite the trunk line shown leading to said connector. In responding to a connection from the main exchange the switch Z′ will operate to thrust its plunger into the bank of contacts thereby extending the connection to the connector P. The operation of Z′ is similar to that explained in connection with the line switch E′. The line relay 175 and release relay $184^a$ are thereupon energized. The relay $184^a$ upon energizing, extends a holding ground from $G^{20}$ through springs 184, bank springs closed by the plunger, and the holding or cut-off winding of said switch Z′ to the battery X. A branch of this circuit extends to contact 188 to cause the master switch to move the remaining plungers away from the seized trunk line. Another branch of this circuit extends over conductor 185 to the bank contact 186 of switch L′, to prevent said switch from seizing connector P as long as it is thus connected with switch Z′. The calling subscriber then operates the said connector P in the known manner to find the desired called line in the branch office.

In the foregoing description it has been assumed that the switching repeater is used in a ten thousand line system, or in a system in which the subscribers' numbers comprise four digits, and that the branch office is not above one thousand lines. For this reason the switching repeater must be capable of operating upon the second digit called. When used in a hundred thousand line system, or in a system in which the subscribers' numbers comprise five digits, and the branch office is not above one thousand lines, it is necessary for the switching repeater to be capable of operating upon the third digit called. For this reason, when operating in a five figure exchange, the relay 73 is replaced by the relays 189 and 190 shown in Fig. 7. The conductors 191 and 192 extend to the battery X; the conductors 193 and 194 extend to the release magnet 74; the conductors 195 and 196 extend to the spring 31; the conductor 197 extends to the bank contact 70 and the conductor 198 extends to the contact 173 and multiples thereof. We will suppose that the subscriber to be called, who is in the same branch office as the calling subscriber, has the number 55300. Upon calling the first digit 5, the wipers 65 of the switching repeater will come to rest upon the bank contact 70 and a circuit will be formed, when the private magnet deënergizes, from ground $G^5$ through the springs 67, 68 and 69, wiper 65, bank contact 70, conductor 197, springs 199 and 200, the upper winding of the relay 189, conductor 194, release magnet 74 and the springs 165 to battery X. Thereupon the switching repeater will be released and the relay 189 will be locked up over a circuit extending from ground $G^3$ through the springs 29, 30 and 31, conductor 195, spring 201, lower winding of relay 189 and the conductor 191 to battery X. Upon calling the second digit 5, the wiper 65 of the switching repeater will come to rest upon the bank contact 70 and a circuit will be formed when the private magnet deënergizes from ground $G^5$ through the springs 67, 68 and 69, wiper 65, bank contact 70, conductor 197, springs 199 and 202, springs 203 and 204, winding of the relay 190, conductor 193, release magnet 74 and the springs 165 to battery X. Thereupon the switching repeater will be released and the relay 100 will be locked up over a circuit extending from ground $G^3$ through the springs 29, springs 30 and 31, conductor 196, springs 205, lower winding of the relay 190 and the conductor 192 to battery X. The energization of the relay 190 also places ground from ground $G^{21}$ through the springs 206 and 203, springs 202 and 199, conductor 197 to the bank contact 70. A circuit is also closed from ground $G^{21}$ through the springs 207 and the conductor 198 to the contact 173 and multiples of the same. Upon calling the third digit 3, the switching repeater will come to rest upon the first idle contact in the third level of bank contacts and the switching relay 174 will operate to connect the calling line with a connector in that group, as previously explained. The remainder of the call and the release of the switches will now take place in the manner previously explained.

While I have illustrated my invention by the use of a number in which the first two digits are the same, it will readily be seen by any one versed in the art that by changing the position of the conductors 197 and 208, the switching repeater could be made to release upon any combination of the first two digits called. Furthermore, while I have illustrated my invention in connection with switches of well-known types, it will, of course, be understood that I do not wish to be limited to the exact construction shown and described, but that various changes and modifications will readily suggest themselves to those skilled in the art without departing from the spirit of my invention.

I claim—

1. In a telephone system, a line, a switch for said line, a second line, a switching relay for said switch, means for operating the switch and for thereby preparing a circuit for said relay and for then releasing the switch, and means whereby when the switch is again operated said relay is operated over said prepared circuit to enable the first and second lines to be brought into connection.

2. In a telephone system, a line, a progressively movable switch for said line, a second line, a switching relay for said switch, means for operating the switch and for thereby preparing a circuit for said relay and for then releasing the switch, and means whereby when the switch is again operated said relay is operated over said prepared circuit to enable the first and second lines to be brought into connection.

3. In a telephone system, a line, a switch for said line, a second line, a switching relay for said switch, means, involving a magnet and a contact for operating the switch and for thereby preparing a circuit for said relay and for then releasing the switch, and means whereby when the switch is again operated, said relay is operated over said prepared circuit to enable the first and second lines to be brought into connection.

4. In a telephone system, a line, a switch for said line, a second line, a switching relay for said switch, means involving a magnet and a pair of contacts, for operating the switch and for thereby preparing a circuit for said relay and for then releasing the switch, and means whereby when the switch is again operated, said relay is operated over said prepared circuit to enable the first and second lines to be brought into connection.

5. In a telephone system, a line, a switch for said line, a second line, a switching relay for said switch, means, involving a magnet and a potential controller, for operating the switch and for thereby preparing a circuit for said relay and for then releasing the switch, and means whereby when the switch is again operated said relay is operated over said prepared circuit to enable the first and second lines to be brought into connection.

6. In a telephone system, a line, a switch for said line, a second line, a switching relay for said switch, means for operating the switch and for thereby preparing a circuit for said relay and for then releasing the switch, and means, involving a contact, whereby when the switch is again operated said relay is operated over said prepared circuit to enable the first and second lines to be brought into connection.

7. In a telephone system, a line, a switch for said line, a second line, a switching relay for said switch, means for operating the switch and for thereby preparing a circuit for said relay and for then releasing the switch, and means involving a magnet and a progressively movable contact, and means whereby when the switch is again operated said relay is operated over said prepared circuit to enable the first and second lines to be brought into connection.

8. In a telephone system, a line, a switch for said line, a second line, a switching relay for said switch, means, involving a magnet and a contact for adjusting the contact to any one of three positions, said means for operating the switch and for thereby preparing a circuit for said relay and for then releasing the switch, and means whereby when the switch is again operated said relay is operated over said prepared circuit to enable the first and second lines to be brought into connection.

9. In a telephone system, a line, a switch for said line, a second line, a switching relay for said switch, means, involving a magnet and a pair of contacts, mechanism for controlling one of said contacts for adjusting the contact to any one of three positions, said means for operating the switch and for thereby preparing a circuit for said relay and for then releasing the switch, and means whereby when the switch is again operated said relay is operated over said prepared circuit to enable the first and second lines to be brought into connection.

10. In a telephone system, a line, a switch for said line, a second line, a switching relay for said switch, means, involving a magnet and a circuit controller, for operating the switch and for thereby preparing a circuit for said relay and for then releasing the switch, and means whereby when the switch is again operated said relay is operated over said prepared circuit to enable the first and second lines to be brought into connection.

11. In a telephone system, a line, a switch for said line, a second line, a switching relay for said switch, means for operating the switch and for thereby preparing a circuit for said relay, means involving a releasing pawl for then releasing the switch, and means whereby when the switch is again operated said relay is operated over said prepared circuit to enable the first and second lines to be brought into connection.

12. In a telephone system, a line, a switch for said line, a second line, a switching relay for said switch, means for operating the switch and for thereby preparing a circuit for said relay and for then releasing the switch, and means, involving a contact and mechanism for adjusting the contact to any one of three positions, whereby when the switch is again operated said relay is operated over said prepared circuit to enable the first and second lines to be brought into connection.

13. In a telephone system, a line, a switch for said line, a second line, a switching relay for said switch, means for operating the switch and for thereby preparing a circuit for said relay and for then releasing the switch, and means, involving a progressively movable contact, whereby, when the switch is again operated, said relay is operated over said prepared circuit to enable the first and second lines to be brought into connection.

14. In a telephone system, a line, a switch for said line, a shaft, a second line, a switching relay for said switch, means, involving a contact on the shaft and a magnet, for operating the shaft and for thereby preparing a circuit for said relay and for then releasing the shaft, and means, involving another contact on said shaft, whereby when the shaft is again operated said relay is operated over said prepared circuit to enable the first and second lines to be brought into connection.

15. In a telephone system, a line, a second line, a switch for the first line for locating the second line, said switch comprising means for enabling the two lines to be brought into connection after the second line is located, a circuit for controlling said means, means controlled by the switch when operated to prepare said circuit, and means for then releasing the switch whereby when the switch is released and again operated said first means is controlled over said prepared circuit.

16. In a telephone system, a line, a second line, a switch provided with a progressively movable shaft for the first line for locating the second line, said switch comprising means for enabling the two lines to be brought into connection after the second line is located, a circuit for controlling said means, means controlled by the switch, through a contact on said shaft, when operated to prepare said circuit and means for then releasing the shaft whereby when the shaft is released and again operated said first means is controlled over said prepared circuit and over another contact on the shaft.

17. In a telephone system, a line, a second line, a switch for said first line, an auxiliary switching mechanism associated with said switch, a magnet for controlling said auxiliary switching mechanism, said switch being provided with means for moving the switch to prepare the circuit of said magnet, means for then releasing the switch and for again operating the switch to locate the second line and to operate said magnet to enable the first and second lines to be connected.

18. In an automatic telephone system, a switch provided with a progressively movable shaft, contact makers on said shaft, a release mechanism associated with said shaft, contacts associated with said contact makers, circuits extending therefrom, a line connected with said switch, switching means for connecting said line with some of said contact makers, a magnet for controlling said switching means, a circuit for said magnet, means for operating said progressively movable shaft and for releasing the same and for at the same time preparing the circuit of said switching magnet, whereby when the switch is again operated said line may be extended to said contact makers.

19. In an automatic telephone trunking system, a trunking switch provided with a progressively movable contact maker, a release mechanism associated with said switch, a contact associated with said contact maker, said release mechanism comprising a magnet for controlling the said mechanism, a circuit for said magnet including said contact maker, another contact, a circuit for applying a potential to said contact, a switch in said last circuit for controlling the same, and means associated with said first contact for operating said switch.

20. In a telephone system, a switch with a progressively movable contact maker, a line associated with said switch, an impulse sending device for sending a plurality of sets of impulses to operate said switch to connect said line with another line, a mechanism associated with said contact maker for releasing the same, means for advancing the contact maker and for then operating the release mechanism to restore the contact maker before the connection is completed in response to the first set of impulses, and for operating the switch in response to the remaining series of impulses to complete the connection.

21. In a telephone system, a line, a switch for said line, a second line, a switching relay for said switch, means for operating the switch and for thereby preparing a circuit for said relay, and for then releasing the switch, said means involving a magnet and a bodily movable contact controlled by mechanism for adjusting said contact to any one of a plurality of positions, and means whereby when the switch is again operated the said relay is operated over said prepared circuit to enable the first and second lines to be brought into connection.

22. In a telephone system, a line, a switch for said line, a second line, a switching relay for said switch, means for operating the switch and for thereby preparing a circuit for said relay and for then releasing the switch, said means involving a magnet and a pair of contacts, one of which contacts being bodily movable and controlled by mechanism for adjusting the said movable contact to any one of a plurality of positions, and means whereby when said switch is again operated, said relay is operated over said prepared circuit to enable the first and second lines to be brought into connection.

23. In a telephone system, a line, a switch for said line, a second line, a switching relay for said switch, means for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

24. In a telephone system, a line, a progressively movable switch for said line, a second line, a switching relay for said switch, means for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

25. In a telephone system, a line, a switch for said line, a second line, a switching relay for said switch, means involving a magnet and a contact, for operating the switch and for thereby preparing a circuit for said relay and for then releasing the switch, means whereby when the switch is again operated, said relay is operated over said prepared circuit to enable the first and second lines to be brought into connection, all of said means including movable contact makers for engaging stationary contacts, lines terminating in said stationary contacts, busy test circuits associated with said line, means responsive when the switch is last operated, for moving said makers into engagement with one of said lines and if the line is busy, for automatically advancing the contact makers through the instrumentality of the corresponding busy test circuit onto the next line.

26. In a telephone system, a line, a switch for said line, a second line, a switching relay for said switch, means involving a magnet and a pair of contacts, for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

27. In a telephone system, a line, a switch for said line, a second line, a switch relay for said switch, means involving a magnet and a potential controller, for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive when the switch is last operated, for moving said makers into engagement with one of said lines and if the line is busy, for automatically advancing the contact makers through the instrumentality of the corresponding busy test circuit onto the next line.

28. In a telephone system, a line, a switch for said line, a second line, a switching relay for said switch, means for operating the switch and for thereby preparing a circuit for said relay, means for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy for automatically advancing the contact makers through the instrumentality of the corresponding busy test circuit onto the next line.

29. In a telephone system, a line, a switch for said line, a second line, a switching relay for said switch, means for operating the switch and for thereby preparing a circuit for said relay and for then releasing the switch, means, involving a contact, whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

30. In a telephone system, a line, a switch for said line, a switching relay for said switch, means for operating the switch and for thereby preparing a circuit for said relay and for then releasing the switch, said means involving a magnet and a progressively movable contact, means whereby when the switch is again operated said relay is operated over said prepared circuit to enable the first and second lines to be brought into connection, movable contact makers for said switch for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

31. In a telephone system, a line, a switch for said line, a second line, a switching relay for said switch, means, involving a magnet and a contact controlled by mechanism for adjusting the contact to any one of three positions, for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

32. In a telephone system, a line, a switch for said line, a second line, a switching relay for said switch, means involving a magnet and a pair of contacts, one of which contacts is controlled by mechanism for adjusting the contact to any one of three positions, for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

33. In a telephone system, a line, a switch for said line, a second line, a switching relay for said switch, means, involving a magnet and a circuit controller, for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines, and if the line is busy, for automatically advancing the contact makers through the instrumentality of the corresponding busy test circuit onto the next line.

34. In a telephone system, a line, a switch for said line, a second line, a switching relay for said switch, means for operating the switch and for thereby preparing a circuit for said relay, means involving a releasing pawl for then releasing the switch, and means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy for automatically advancing the contact makers through the instrumentality of the corresponding busy test circuit onto the next line.

35. In a telephone system, a line, a switch for said line, a second line, a switching relay for said switch, means for operating the switch and for thereby preparing a circuit for said relay and for then releasing the switch, and means, involving a contact controlled by mechanism for adjusting the contact to any one of three positions, whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

36. In a telephone system, a line, a switch for said line, a second line, a switching relay for said switch, means for operating the switch and for thereby preparing a circuit for said relay and for then releasing the switch, and means, involving a progressively movable contact, whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

37. In a telephone system, a line, a switch for said line, a shaft, a second line, a switching relay for said switch, means involving a contact on the shaft and a magnet, for operating the shaft and for thereby preparing a circuit for said relay and for then releasing the shaft, and means, involving another contact on said shaft, whereby when the shaft is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

38. In a telephone system, a line, a second line, a switch for the first line for locating the second line, said switch comprising means for enabling the two lines to be brought into connection after the second line is located, a circuit for controlling said means, means controlled by the switch when operated to prepare said circuit, and means for then releasing the switch whereby when the switch is released and again operated said first means is controlled over said prepared circuit, all of said means including movable contact makers for engaging stationary contacts, lines terminating in said stationary contacts, busy test circuits associated with said lines, means responsive, when the switch is last operated for moving said makers into engagement with one of said lines and if the line is busy for automatically advancing the contact makers through the instrumentality of the corresponding busy circuit onto the next line.

39. In a telephone system, a line, a second line, a switch provided with a progressively movable shaft for the first line for locating the second line, said switch comprising means for enabling the two lines to be brought into connection after the second line is located, a circuit for controlling said means, means controlled by the switch, through a contact on said shaft, when operated, to prepare said circuit and means for then releasing the shaft whereby when the shaft is released and again operated said first means is controlled over said prepared circuit and over another contact on the shaft, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

40. In a telephone system, a line, a second line, a switch for said first line, an auxiliary switching mechanism associated with said switch, a magnet for controlling said auxiliary switching mechanism, said switch being provided with means for moving the switch to prepare the circuit of said magnet, means for then releasing the switch and for again operating the switch to locate the second line and to operate said magnet to enable the first and second lines to be connected, movable contact makers for said switch for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding test circuit onto the next line.

41. In an automatic telephone system, a switch provided with a progressively movable shaft, contact makers on said shaft, a release mechanism associated with said shaft, contacts associated with said contact makers, circuits extending therefrom, a line connected with said switch, switching means for connecting said line with some of said contact makers, a magnet for controlling said switching means, a circuit for said magnet, means for operating said progressively movable shaft and for releasing the same and for at the same time preparing the circuit of said switching magnet, whereby when the switch is again operated, said line may be extended to said contact makers, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line.

42. In a telephone system, a line, a switch for said line, a second line, a switching relay for said switch, means for operating the switch and for thereby preparing a circuit for said relay and for then releasing the switch, and means whereby when the switch is again operated said relay is operated over said prepared circuit to enable the first and second lines to be brought into connection, said first means comprising also a device for maintaining the circuit of said relay in its prepared condition during the interval between the releasing of the switch in the first instance and the operation of the switch thereafter.

43. In a telephone system, a line, a switch for said line, a second line, a switching relay for said switch, means, involving a magnet and a contact for operating the switch and for thereby preparing a circuit for said relay and for then releasing the switch, and means whereby when the switch is again operated said relay is operated over said prepared circuit to enable the first and second lines to be brought into connection, said first means comprising also a device for maintaining the circuit of said relay in its prepared condition during the interval between the releasing of the switch in the first instance and the operation of the switch thereafter.

44. In a telephone system, a line, a switch for said line, a second line, a switching relay for said switch, means involving a magnet and a pair of contacts, for operating the switch and for thereby preparing a circuit for said relay and for then releasing the switch, and means whereby when the switch is again operated, said relay is operated over said prepared circuit to enable the first and second lines to be brought into connection, said first means comprising also a device for maintaining the circuit of said relay in its prepared condition during the interval between the releasing of the switch in the first instance and the operation of the switch thereafter.

45. In a telephone system, a line, a switch for said line, a second line, a switching relay for said switch, means, involving a magnet and a potential controller, for operating the switch and for thereby preparing a circuit for said relay and for then releasing the switch, and means whereby when the switch is again operated said relay is operated over said prepared circuit to enable the first and second lines to be brought into connection, said first means comprising also a device for maintaining the circuit of said relay in its prepared condition during the interval between the releasing of the switch in the first instance and the operation of the switch thereafter.

46. In a telephone system, a line, a switch for said line, a second line, a switching relay for said switch, means, involving a magnet and a circuit controller, for operating the switch and for thereby preparing a circuit for said relay and for then releasing the switch, and means whereby when the switch is again operated said relay is operated over said prepared circuit to enable the first and second lines to be brought into connection, said first means comprising also a device for maintaining the circuit of said relay in its prepared condition during the interval between the releasing of the switch in the first instance and the operation of the switch thereafter.

47. In a telephone system, a line, a switch for said line a second line, a switching relay for said switch, means for operating the switch and for thereby preparing a circuit for said relay, means involving a releasing pawl for then releasing the switch, and means whereby when the switch is again operated said relay is operated over said prepared circuit to enable the first and second lines to be brought into connection, said first means comprising also a device for maintaining the circuit of said relay in its prepared condition during the interval between the releasing of the switch in the first instance and the operation of the switch thereafter.

48. In a telephone system, a line, a second line, a switch for the first line for locating the second line, said switch comprising means for enabling the two lines to be brought into connection after the second line is located, a circuit for controlling said means, means controlled by the switch when operated to prepare said circuit, and means for then releasing the switch whereby when the switch is released and again operated said first means is controlled over said prepared circuit, said second means comprising also a device for maintaining the circuit of said first means in its prepared condition during the interval between the releasing of the switch in the first instance and the operation of the switch thereafter.

49. In a telephone system, a line, a second line, a switch for said first line, an auxiliary switching mechanism associated with said switch, a magnet for controlling said auxiliary switching mechanism, said switch being provided with means for moving the switch to prepare the circuit of said magnet, means for then releasing the switch and for again operating the switch to locate the second line and to operate said magnet to enable the first and second lines to be connected, said first means comprising also a device for maintaining the circuit of said magnet in its prepared condition during the interval between the releasing of the switch in the first instance and the operation of the switch thereafter.

50. In an automatic telephone system, a switch provided with a progressively movable shaft, contact makers on said shaft, a release mechanism associated with said shaft, contacts associated with said contact makers, circuits extending therefrom, a line connected with said switch, switching means for connecting said line with some of said contact makers, a magnet for controlling said switching means, a circuit for said magnet, means for operating said progressively movable shaft and for releasing the same and for at the same time preparing the circuit of said switching magnet, whereby when the switch is again operated said line may be extended to said contact makers, said second means comprising also a device for maintaining the circuit of said magnet in its prepared condition during the interval between the releasing of the switch in the first instance and the operation of the switch thereafter.

51. In a telephone system, a switch with a progressively movable contact maker, a line associated with said switch, an impulse sending device for sending a plurality of sets of impulses to operate said switch, a relay in said switch for connecting said line with another line, a mechanism associated with said contact maker for releasing the same, means for advancing the contact maker and for then operating the release mechanism to restore the contact maker and to prepare a circuit for said relay, and for operating the switch in response to the remaining series of impulses to open said relay to complete the connection, said first means comprising also a device for maintaining the circuit of said relay in its prepared condition during the interval between the releasing of the switch in the first instance and the operation of the switch thereafter.

52. In a telephone system, a line, a switch for said line, a second line, a switching relay for said switch, means for operating the switch and for thereby preparing a circuit for said relay, and for then releasing the switch, said means involving a magnet and a bodily movable contact controlled by mechanism for adjusting said contact to any one of a plurality of positions, and means whereby when the switch is again operated, the said relay is operated over said prepared circuit to enable the first and second lines to be brought into connection, said first means comprising also a device for maintaining the circuit of said relay in its prepared condition during the interval between the releasing of the switch in the first instance and the operation of the switch thereafter.

53. In a telephone system, a line, a switch for said line, a second line, a switching relay for said switch, means for operating the switch and for thereby preparing a circuit for said relay and for then releasing the switch, said means involving a magnet and a pair of contacts, one of which contacts being bodily movable and controlled by mechanism for adjusting the said movable contact to any one of a plurality of positions, and means whereby when said switch is again operated said relay is operated over said prepared circuit to enable the first and second lines to be brought into connection, said first means comprising also a device for maintaining the circuit of said relay in its prepared condition during the interval between the releasing of the switch in the first instance and the operation of the switch thereafter.

54. In a telephone system, a line, a switch for said line, a second line, a switching relay for said switch, means for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line, said first means comprising also a device for maintaining the circuit of said relay in its prepared condition during the interval between the releasing of the switch in the first instance and the operation of the switch thereafter.

55. In a telephone system, a line, a progressively movable switch for said line, a second line, a switching relay for said switch, means for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line, said first means comprising also a device for maintaining the circuit of said relay in its prepared condition during the interval between the releasing of the switch in the first instance and the operation of the switch thereafter.

56. In a telephone system, a line, a switch for said line, a second line, a switching relay for said switch, means for operating the switch and for thereby preparing a circuit for said relay and for then releasing the switch, and means whereby when the switch is again operated said relay is operated over said prepared circuit to enable the first and second lines to be brought into connection, said first means comprising also an electromagnetic device for maintaining the circuit of said relay in its prepared condition during the interval between the releasing of the switch in the first instance and the operation of the switch thereafter.

57. In a telephone system, a line, a switch for said line, a second line, a switching relay for said switch, means involving a magnet and a contact, for operating the switch and for thereby preparing a circuit for said relay and for then releasing the switch, and means whereby when the switch is again operated, said relay is operated over said prepared circuit to enable the first and second lines to be brought into connection, said first means comprising also an electromagnetic device for maintaining the circuit of said relay in its prepared condition during the interval between the releasing of the switch in the first instance and the operation of the switch thereafter.

58. In a telephone system, a line, a switch for said line, a second line, a switching relay for said switch, means involving a magnet and a pair of contacts, for operating the switch and for thereby preparing a circuit for said relay and for then releasing the switch, and means whereby when the switch is again operated, said relay is operated over said prepared circuit to enable the first and second lines to be brought into connection, said first means comprising also an electromagnetic device for maintaining the circuit of said relay in its prepared condition during the interval between the releasing of the switch in the first instance and the operation of the switch thereafter.

59. In a telephone system, a line, a switch for said line, a second line, a switching relay for said switch, means, involving a magnet and a potential controller, for operating the switch and for thereby preparing a circuit for said relay and for then releasing the switch, and means whereby when the switch is again operated said relay is operated over said prepared circuit to enable the first and second lines to be brought into connection, said first means comprising also an electromagnetic device for maintaining the circuit of said relay in its prepared condition during the interval between the releasing of the switch in the first instance and the operation of the switch thereafter.

60. In a telephone system, a line, a switch for said line, a second line, a switching relay for said switch, means, involving a magnet and a circuit controller, for operating the switch and for thereby preparing a circuit for said relay and for then releasing the switch, and means whereby when the switch is again operated said relay is operated over said prepared circuit to enable the first and second lines to be brought into connection, said first means comprising also an electromagnetic device for maintaining the circuit of said relay in its prepared condition during the interval between the releasing of the switch in the first instance and the operation of the switch thereafter.

61. In a telephone system, a line, a switch for said line, a second line, a switching relay for said switch, means for operating the switch and for thereby preparing a circuit for said relay, means involving a releasing pawl for then releasing the switch, and means whereby when the switch is again operated said relay is operated over said prepared circuit to enable the first and second lines to be brought into connection, said first means comprising also an electromagnetic device for maintaining the circuit of said relay in its prepared condition during the interval between the releasing of the switch in the first instance and the operation of the switch thereafter.

62. In a telephone system, a line, a second line, a switch for the first line for locating the second line, said switch comprising means for enabling the two lines to be brought into connection after the second line is located, a circuit for controlling said means, means controlled by the switch when operated to prepare said circuit, and means for then releasing the switch whereby when the switch is released and again operated said first means is controlled over said prepared circuit, said second means comprising also an electromagnetic device for maintaining the circuit of said first means in its prepared condition during the interval between the releasing of the switch in the first instance and the operation of the switch thereafter.

63. In a telephone system, a line, a second line, a switch for said first line, an auxiliary switching mechanism associated with said switch, a magnet for controlling said auxiliary switching mechanism, said switch being provided with means for moving the switch to prepare the circuit of said magnet, means for then releasing the switch and for again operating the switch to locate the second line and to operate said magnet to enable the first and second lines to be connected, said first means comprising also an electromagnetic device for maintaining the circuit of said magnet in its prepared condition during the interval between the releasing of the switch in the first instance and the operation of the switch thereafter.

64. In an automatic telephone system a switch provided with a progressively movable shaft, contact makers on said shaft, a release mechanism associated with said shaft, contacts associated with said contact makers, circuits extending therefrom, a line connected with said switch, switching means for connecting said line with some of said contact makers, a magnet for controlling said switching means, a circuit for said magnet, means for operating said progressively movable shaft and for releasing the same and for at the same time preparing the circuit of said switching magnet, whereby when the switch is again operated said line may be extended to said contact makers, said second means comprising also an electromagnetic device for maintaining the circuit of said magnet in its prepared condition during the interval between the releasing of the switch in the first instance and the operation of the switch thereafter.

65. In a telephone system, a switch with a progressively movable contact maker, a line associated with said switch, an impulse sending device for sending a plurality of sets of impulses to operate said switch, a relay in said switch for connecting said line with another line, a mechanism associated with said contact maker for releasing the same, means for advancing the contact maker and for then operating the release mechanism to restore the contact maker and to prepare a circuit for said relay, and for operating the switch in response to the remaining series of impulses to operate said relay to complete the connection, said first means comprising also an electromagnetic device for maintaining the circuit of said relay in its prepared condition during the interval between the releasing of the switch in the first instance and the operation of the switch thereafter.

66. In a telephone system, a line, a switch for said line, a second line, a switching relay for said switch, means for operating the switch and for thereby preparing a circuit for said relay, and for then releasing the switch, said means involving a magnet and a bodily movable contact controlled by mechanism for adjusting said contact to any one of a plurality of positions, and means whereby when the switch is again operated the said relay is operated over said prepared circuit to enable the first and second lines to be brought into connection, said first means comprising also an electromagnetic device for maintaining the circuit of said relay in its prepared condition during the interval between the releasing of the switch in the first instance and the operation of the switch thereafter.

67. In a telephone system, a line, a switch for said line, a second line, a switching relay for said switch, means for operating the switch and for thereby preparing a circuit for said relay and for then releasing the switch, said means involving a magnet and a pair of contacts, one of which contacts being bodily movable and controlled by mechanism for adjusting the said movable contact to any one of a plurality of positions, and means whereby when said switch is again operated said relay is operated over said prepared circuit to enable the first and second lines to be brought into connection, said first means comprising also an electromagnetic device for maintaining the circuit of said relay in its prepared condition during the interval between releasing of the switch in the first instance and the operation of the switch thereafter.

68. In a telephone system, a line, a switch for said line, a second line, a switching relay for said switch, means for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line, said first means comprising also an electromagnet device for maintaining the circuit of said relay in its prepared condition during the interval between the releasing of the switch in the first instance and the operation of the switch thereafter.

69. In a telephone system, a line, a progressively movable switch for said line, a second line, a switching relay for said switch, means for operating the switch and for thereby preparing a circuit for said relay and for then releasing the switch, means whereby when the switch is again operated said relay is operated over said prepared circuit to enable the first and second lines to be brought into connection, all of said means including movable contact makers for engaging stationary contacts, lines terminating in said stationary contacts, busy test circuits associated with said lines, means responsive, when the switch is last operated, for moving said makers into engagement with one of said lines and if the line is busy, for automatically advancing the contact makers through the instrumentality of the corresponding busy test circuit onto the next line, said first means comprising also an electromagnet device for maintaining the circuit of said relay in its prepared condition during the interval between the releasing of the switch in the first instance and the operation of the switch thereafter.

70. In a telephone system, a switch normally functioning as a repeater and having a step-by-step movable member, which is movable responsive to the first series of impulses applied to said switch, and means controlled by said member for releasing the switch responsive to a predetermined number of impulses being transmitted thereto.

71. A selector having levels of bank contacts and wipers, said contacts terminating in the out-going trunks corresponding to a plurality of decades, an auxiliary wiper carried by the shaft of said selector which is adapted to engage a contact corresponding to one of said levels corresponding to a first decade, a release circuit, said contact completing the release circuit for the purpose of restoring said shaft to normal position and incidentally adapt the wipers of said selector to electrically register with out-going trunk contacts to a second decade.

72. In a telephone system, an automatic switch responsive to a plurality of the digits of a called number to extend a connection in the direction of the called line, an auxiliary wiper for said switch, contacts accessible to said switch arranged in rows or levels, said switch operated in response to a digit to bring said wiper into engagement with a contact associated with one of said levels, a circuit completed through said wiper and contact for releasing said switch, and a switching operation performed by said switch while operating and releasing in response to said digit.

73. In a telephone system, an automatic switch having an operating magnet, an auxiliary wiper associated with said switch, a special contact for certain of said levels coöperating with said auxiliary wiper when said wiper engages one of them to perform a switching operation, said magnet responsive to one digit of a called number to bring said auxiliary wiper into engagement with one of said special contacts, a release circuit completed through said contact for automatically releasing and performing said switching operation said magnet being then responsive to the next digit of said called number to extend a connection over a set of contacts in another of said levels.

74. In a telephone system, an automatic switch having wipers, and contacts accessible thereto divided into groups or levels, a magnet for said switch responsive to one digit of a called number to raise said wipers to a predetermined point with one of said wipers in engagement with a contact associated with one of said levels, and a circuit completed through said contact to then automatically release and perform a preliminary switching operation, said magnet responsive to one or more succeeding digits of said called number to again raise said wipers and extend a connection therethrough to the direction of a called line.

75. In a telephone system, an automatic switch having a step-by-step movable member, means for operating said member in response to the first series of impulses delivered to said switch and means controlled by said member for releasing the switch when operated by a predetermined number of impulses and means for then again operating said switch in response to the next series of impulses.

76. In a telephone system, an automatic switch having a step-by-step movable member, means for operating said member in response to the first series of impulses delivered to said switch and means controlled by said member for releasing the switch when operated by a predetermined number of impulses and means for then again operating said switch in response to the next series of impulses, and a switching operation performed by said switch while operating and releasing in response to said digit said switching operation performed by the advance and release of said member.

77. In a telephone system, an automatic switch having a movable member and levels of contacts accessible thereto, one or more of said levels being predetermined as a critical level, means for operating said switch to any level and means for releasing the switch, only the first time it stops at said critical levels during the progress of a single call.

78. In a telephone system, an automatic switch having a movable member and levels of contacts accessible thereto, one or more of said levels being predetermined as a critical level, means for operating said switch to any level and means for releasing the switch, and performing a switching operation, only the first time it stops at said critical level during the progress of a single call.

79. In a telephone system, an automatic switch having wipers, contacts accessible thereto divided into rows or levels, means for sending a plurality of series of impulses to said switch in accordance with the digits of a called number, means responsive to the first series of impulses for raising said wipers to a certain level, means for releasing said switch if said level is predetermined as a critical level, and means responsive to the next series of impulses for again raising said wipers and extending a connection toward a called subscriber.

80. In a telephone system, an automatic switch having wipers, contacts accessible thereto divided into rows or levels, means for sending a plurality of series of impulses to said switch in accordance with the digits of a called number, means responsive to the first series of impulses for raising said wipers to a certain level, means for releasing said switch if said level is predetermined as a critical level, and means responsive to the next series of impulses for again raising said wipers and extending a connection toward a called subscriber, and a switching operation performed by the raising and release of said wipers.

81. In a telephone system, a line, a pair of movable contact makers for said line, a plurality of stationary contacts associated with each maker, a shaft for carrying said makers, means, involving an impulse sender and a magnet responsive thereto, for advancing said shaft whereby the makers may be advanced adjacent to one of their respective associated contacts, means involving a release magnet for then releasing the shaft for removing the makers from their advanced position, means involving a switching relay for switching said line into engagement with one of said makers, lines terminating in said stationary contacts, busy test circuits, associated with said lines, and means whereby when said first means is again operated to move the makers adjacent to a group of contacts the makers may be moved into engagement with one of said lines and if the line is busy the makers are advanced automatically through the instrumentality of the corresponding busy test circuit onto the next contact.

82. In a telephone system, an automatic switch having an extending circuit, said switch having numerical and non-numerical operations, a plurality of groups of lines associated with said switch, a plurality of groups of contact makers for engaging said lines, one of said groups of contact makers being normally connected with said extending circuit while the other set is disconnected therefrom, and means controlled by the numerical operation of said switch for disconnecting said connected group and for connecting said disconnected group.

83. In a telephone system, an automatic switch having an extending circuit, said switch having numerical and non-numerical operations, a plurality of groups of lines associated with said switch, a plurality of groups of contact makers for engaging said lines, one of said groups of contact makers being normally connected with said extending circuit while the other set is disconnected therefrom, and means comprising a relay controlled by the numerical operation of said switch for disconnecting said connected group and for connecting said disconnected group.

84. In a telephone system, an automatic switch, a line extending to said switch, groups of lines associated with said switch, a plurality of groups of contact makers for engaging said lines, means for transmitting a series of impulses to operate said switch and to cause said switch to automatically select an idle line in one of said groups of lines and means comprising a relay in said switch for electing one of said groups of contact makers, a circuit for said relay, said circuit adapted to be closed by the transmission of a predetermined number of impulses.

85. In a telephone system, a calling and a called line, a telephone number assigned to the called line, the first two digits in said number being the same, a first selector operable in response to the calling of the first of said digits, means for automatically releasing said first selector the first time it is operated, means for preventing the release of said first selector when the second of said digits is called, the said first selector being operated to extend the connection in the direction of the called line, and other switches operable responsive to the remaining digits to complete the connection.

86. In a telephone system, means including a drop back selector for connecting calling and called lines, groups of trunk lines accessible to said selector, calling dials at the stations on said lines, means for operating said selector responsive to a single operation of the dial at a calling station to connect with an idle trunk in one of said groups, and means requiring two successive and identical operations of the dial at said calling station to operate said selector to connect with an idle trunk in another of said groups.

87. In a telephone system, a first selector for use in connecting a calling and called line, means in said switch for operating and releasing the same responsive to the calling of the first digit in the number of the called line, means for reoperating said switch when the second digit is called, the second digit being the same as the first, and means for preventing the release of said switch when it is reoperated, the said switch being thereby enabled to extend the connection in the direction of the called line.

Signed at Chicago, Illinois, this 1st day of September, 1920.

HENRY E. HERSHEY.